Jan. 11, 1938. R. MASINO ET AL 2,104,755
COMBINATION COTTON TIE BUCKLE AND IDENTIFICATION TAG
Filed Jan. 25, 1934
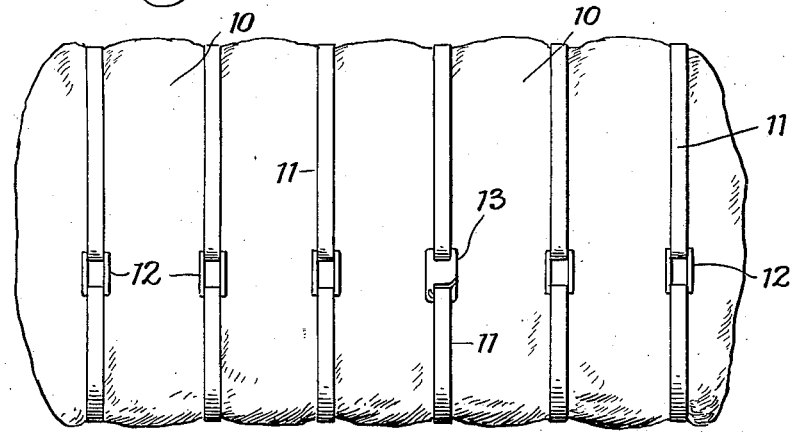
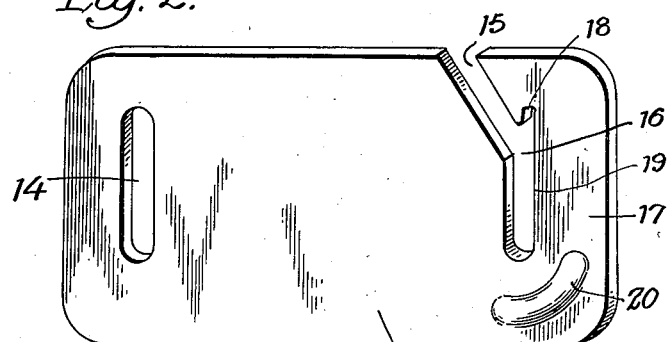
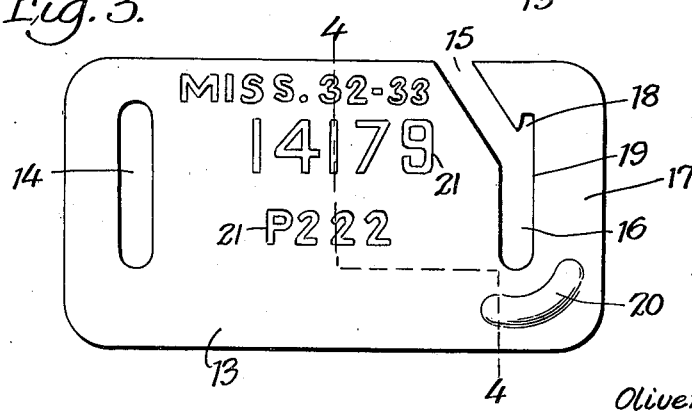 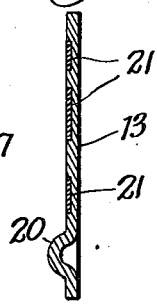
Inventors
Oliver H. Keep, deceased
Ruth Masino, executrix
By
/s/ Attorney Patented Jan. 11, 1938

2,104,755

UNITED STATES PATENT OFFICE 2,104,755

COMBINATION COTTON TIE BUCKLE AND IDENTIFICATION TAG

Ruth Masino, and Oliver H. Keep, deceased, late of Memphis, Tenn., by Ruth Masino, executrix, Memphis, Tenn., assignors to Ruth Masino George, Vicksburg, Miss.

Application January 25, 1934, Serial No. 708,318

4 Claims. (Cl. 40—21)

This invention relates to a combination cotton tie buckle and identification tag and the primary object thereof is to provide a device of this character which shall be indestructible in the sense that it will not lose its capacity of identifying a bale to which it has been attached, even after such prolonged and destructive fires as occur in cotton storage warehouses, it being also proof against destruction by water or any other agency that is to be reckoned with in the handling and storage of cotton bales. Many and various methods and devices have been suggested for marking cotton bales, but, so far as known to applicants, all such markers and markings have been readily destructible by fire, water, and other hazards, and hence there has been a tremendous amount of trouble, e. g. in collecting insurance after fires, floods etc., with consequent unnecessary loss either to the insurer or to the insured, and often with prolonged litigation which is expensive to the parties and uncertain in results due to the inability of all parties to determine positively the cotton destroyed or damaged. Aside from such destruction as above referred to, there is much difficulty resulting from loss of tags and/or obliteration of marks and numbers placed on bales after ginning, which difficulty is rendered negligible in amount by the use of the device.

Such conditions are also a great temptation to fraud because of the value of the property involved and the difficulty of detection of the fraudulent operations. Permanent identification by an indestructible device is a matter of great convenience not only to ginners, warehouseman, spinners and insurance companies, but also to bankers, cotton factors, railroad and steamship companies, tax collecting agencies, levee boards, etc.

Another object of the invention is to provide a device of the character described which can be attached originally to the ginner's bale and later transferred to the compressed bale, so that the identification is positive and permanent from the gin to the ultimate user of the cotton in the bale. Such transfer will enable any loss due to improper or non-uniform contents, spoilage, etc., to be traced back to the producer and so will eliminate much controversy and dissatisfaction while redounding to the advantage of the careful and conscientious producers by higher final prices, due to avoidance of loss by spinners on account of untraceable or controversial defects in the bales of cotton delivered to them.

After a warehouse fire it is at present commonly impossible to be certain of the number of bales destroyed. The use of the device will not only eliminate controversies, but it will speed up the settlement of just claims and will tend to prevent thefts and switching of cotton by its absolute proof of ownership. Various economies follow from its use, as it eliminates any need of marking with ink (an impermanent and unsatisfactory procedure), it takes the place of one of the usual tie buckles, and it saves the cost of a paper tag such as now commonly used, and hence its use will not result in added expense, if in fact it does not actually decrease the expense of baling and marking.

Referring to the drawing, which is made a part of this application and in which similar reference characters indicate similar parts:

Fig. 1 is an elevation of a cotton bale, showing the use of the combined tag and buckle, Fig. 2, a perspective of the same, substantially showing the dimensions actually preferred, Fig. 3, a face view of the device, and Fig. 4, a section on line 4—4 of Fig. 3.

In the drawing, reference character 10 indicates a bale of cotton, having metal bands 11, as usual, held together by buckles 12 of any desirable or conventional character. A combination tie buckle and identification tag according to the invention is shown at 13 in said figure.

The body of the device 13, in the preferred form, as shown in detail in Figs. 2, 3, and 4, is provided near one end with a slot 14 for attachment of a tie or band in usual manner. At the other end it has an inclined slit 15 leading to a slot 16. The walls of the slots 14 and 16 next the ends of the tag are parallel so as to provide parallel surfaces against which the tie bears at its ends, and so as to make the strain uniform throughout the width of the tie and the tag. The hook-like portion 17 of the tag is undercut at 18 to avoid an obtuse angle at this point, to insure that the tie shall rest solely against the wall at 19 and to avoid such an obtuse angle at this point as might permit the edge of the tie to ride up into the slit 15 or to hang on the inclined wall portion when being applied.

The body of the device is of substantial thickness, e. g. about $\frac{3}{16}$ inch thick, and is preferably made of steel, it being the intention that the combined buckle and tag shall be stronger than the band applied thereto. In other words, it is intended that if either part breaks under excessive strain, the band shall break and not the tag. It is found that the weakest part of the tag is at the base of the hook-like portion 17 and this is reinforced by a strengthening rib 20, curved substantially as the adjacent wall of slot 16.

In order to permit the buckle so far described to function as an identification tag the slots 14 and 16 are separated by a relatively wide flat outer face on which identifying marks are placed and to insure that such marks shall not be effaced or obliterated the face of the tag is preferably indented to a substantial depth, as shown at 21 in Fig. 4. Due to the thickness of the metal and the depth of the indentations any ordinary fire or other hazard will not destroy the identification of a bale to which the device is applied. Preferably the indentations are filled with white paint or the like for convenience in reading the markings which, as here shown, indicate the locality and season of production, the number of the bale and the ginner's license number.

It will be obvious to those skilled in the art that various changes may be made in the device without departing from the spirit of the invention and therefore the invention should not be limited to what is shown in the drawing and described in the specification but only as indicated in the appended claims.

Having thus fully described the said invention, what is claimed as new and desired to be secured by Letters Patent is:

1. A combination cotton tie buckle and identification tag comprising an elongated metal plate having at opposite ends thereof parallel transverse slots, said slots being widely spaced to leave a relatively large face between them for the reception of identifying characters, said plate having a slit leading to a side edge of the plate from one of said slots and defining a hook in the respective end, said last-named slot at one end intersecting the overhanging portion of the hook, and an arcuate reinforcing rib concentric with the other end of said slot, substantially as set forth.

2. A combination cotton tie buckle and identification tag comprising an elongated metal plate having parallel slots adacent the opposite ends thereof, a slit leading from an intermediate portion of one of said slots to a side edge of the plate said slit being inclined toward the mid-length of the plate so as to form an undercut hook at one end of the plate, a reinforcing rib substantially concentric with the closed end of said last-named slot, there being a relatively wide face on the plate between said slots, and identifying marks deeply indented into said face, substantially as set forth.

3. A combination cotton tie buckle and identification tag comprising an elongated metal plate having a closed slot at one end and a parallel slot at the other and with an oblique slit leading to the adjacent side edge of the plate to form a hook at that end, and a reinforcing rib on the plate substantially concentric with the closed end of the last-named slot.

4. A combination cotton tie buckle and identification tag comprising an elongated metal plate having parallel slots adjacent the opposite ends thereof, a slit leading from an intermediate portion of one of said slots to a side edge of the plate said slit being inclined toward the mid-length of the plate so as to form an undercut hook at one end of the plate, a reinforcing rib substantially concentric with the closed end of said last-named slot, there being a relatively wide face on the plate between said slots, and identifying marks on said face, substantially as set forth.

RUTH MASINO.
RUTH MASINO,
Executrix for Oliver H. Keep, Deceased.